1## United States Patent [19]

Wright et al.

[11] 3,915,996

[45] Oct. 28, 1975

[54] PROCESS FOR MAKING BENZOPYRANS
[75] Inventors: Howard Bernard Wright, Gurnee; Bruce Wayne Horrom, Waukegan, both of Ill.
[73] Assignee: Abbott Laboratories, North Chicago, Ill.
[22] Filed: June 8, 1973
[21] Appl. No.: 367,027

Related U.S. Application Data
[63] Continuation-in-part of Ser. No. 298,132, Oct. 16, 1972, abandoned.

[52] U.S. Cl. ...... 260/345.3; 260/297 T; 260/297 F; 260/326.5 B; 260/332.2 P; 260/327 TH
[51] Int. Cl.² ... C07D 311/80; C07D 311/94; C07D 291/08
[58] Field of Search .......... 260/345.3, 297 T, 297 F, 260/326.5 B, 332.2 P, 327 TH

[56] References Cited
UNITED STATES PATENTS

| | | | |
|---|---|---|---|
| 2,419,934 | 5/1947 | Adams | 260/345.3 |
| 2,419,935 | 5/1947 | Adams | 260/345.3 |

FOREIGN PATENTS OR APPLICATIONS

| | | | |
|---|---|---|---|
| 1,181,767 | 2/1970 | United Kingdom | 260/345.3 |

Primary Examiner—John M. Ford
Attorney, Agent, or Firm—Robert L. Niblack; Joyce R. Krei; Vincent A. Mallare

[57] ABSTRACT

In the process for synthesizing benzopyrans, the improvement comprising condensing the appropriately substituted resorcinol and the appropriate β-keto ester in the presence of methanesulfonic acid.

3 Claims, No Drawings

PROCESS FOR MAKING BENZOPYRANS

CROSS REFERENCE TO RELATED APPLICATIONS

This application is a continuation-in-part of co-pending application, Ser. No. 298,132, filed Oct. 16, 1972, now abandoned.

DETAILED DESCRIPTION OF THE INVENTION

This invention relates to an improved process for synthesizing the class of chemical compounds generally designated as benzopyrans.

The benzopyrans are a useful class of therapeutic agents, with activity in the central nervous system, cardiovascular and analgesic areas. One of the problems currently faced in developing the benzopyrans is the difficulty and expense encountered in their preparation. The difficulty and expense has been increased in going from laboratory scale runs to development scale runs.

The benzopyrans which can be prepared by the method of this invention are represented by Formula I

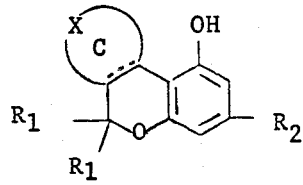

wherein the C ring is a 5 membered ring when X is being $CH_2$, or a five or six membered ring when X is S or N, with optional substitutions on the C ring or the hetero atom or the C ring is a quinuclidine ring; $R_1$ is loweralkyl and $R_2$ is $C_1$–$C_{20}$ alkyl, $C_3$–$C_8$ cycloalkyl, loweralkylcycloalkyl or

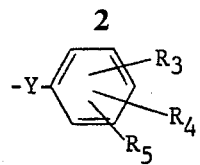

wherein each $R_3$, $R_4$ or $R_5$ are the same or different members of the group consisting of hydrogen, halo, trifluoromethyl or loweralkyl and Y is a straight or branched chain alkylene group having from 1 to 10 carbon atoms.

Compounds of Formula I are generally prepared by reacting the corresponding pyrone with a loweralkyl magnesium halide as illustrated by the following equation:

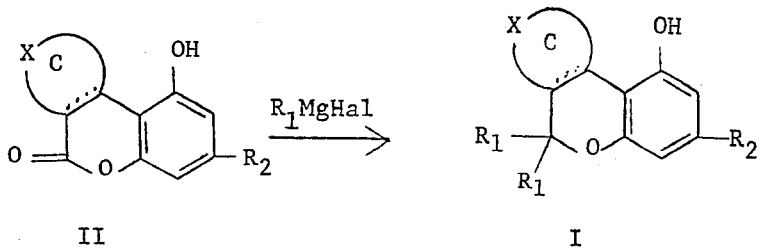

The compounds of Formula II have classically been prepared by reacting the appropriately substituted β-keto ester (Formula IV) with the appropriate resorcinol (Formula III) in a mixture of concentrated sulfuric acid and phosphorus oxychloride as illustrated by the following reaction sequence:

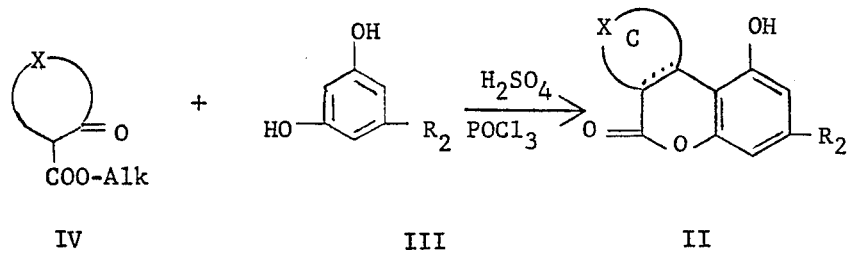

The above reaction proceeds with difficulty and the yields are rather low for several reasons. The sulfuric acid tends to sulfonate the desired product and a great deal of charring and decomposition of product occurs making the work up quite difficult. Furthermore, when sulfuric acid is used, the reactants remain as a slurry for quite some time, and it is difficult to get the reactants into solution.

We have found that when the condensation of the resorcinol and the β-keto ester is carried out in methane sulfonic acid, the methane sulfonic acid solubilizes the reactants, shortens the reaction time, avoids charring, makes the reaction easier to handle, and increases yields a minimum of 20 to 30 percent.

This method has been found to be particularly useful in preparing the following illustrative classes of benzopyrans:

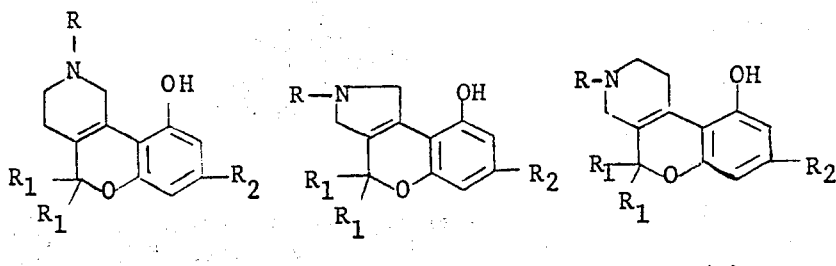

(A)　(B)　(C)

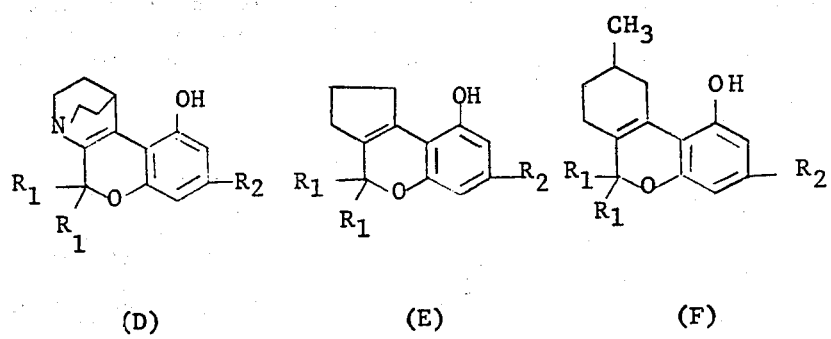

(D)　(E)　(F)

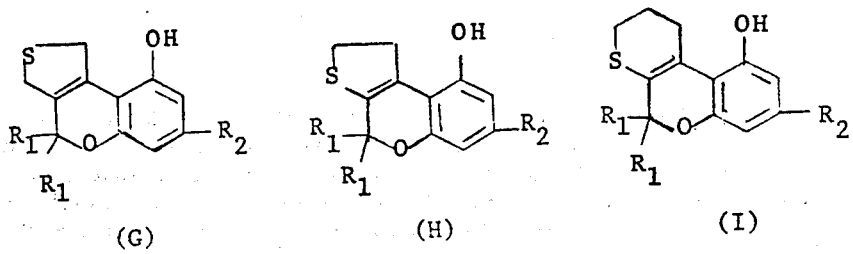

(G)　(H)　(I)

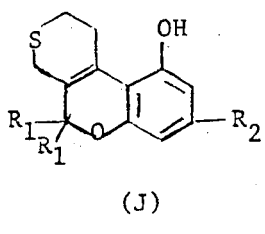

(J)

and the like.

The preparation of (A) and the intermediate therefore are described in U.S. Pat. No. 3,576,798. The preparation of (B) and their intermediate are described in German Serial No. P20353633; the preparation of (C) and their intermediates are described in U.S. Pat. No. 3,635,933; the preparation of (D) and their intermediates are described in U.S. Pat. No. 3,493,579; the preparation of (E) and their intermediates are described in U.S. Pat. No. 3,493,579; the preparation of (F) and their intermediates have been described by Adams et al., J. Am. Chem. Soc., 62, 2245 and 2407 (1940) and Mechoulam et al., J. Am. Chem. Soc., 89, 4552 (1967). The preparation of (G), (H), (I), and (J) and their intermediates are described in Belgium Pat. No. 755,213.

In the practice of this invention, compounds of Formulae III and IV, the appropriate resorcinol and the appropriate β-keto ester are prepared according to the methods described in the above listed patents and articles. The resorcinol and β-keto ester are then condensed in the presence of a 5 to 10 mole excess of methanesulfonic acid at a temperature under 35°C. and preferably no lower than 0°C. for a period of from 24 to 192 hours. Optimum results are reached if the reaction is run for a period of 120 hours at room temperature (24°–26°C). The resulting intermediate is then converted to the corresponding benzopyran by the methods taught in the above patents and patent applications; namely, by reacting the pyrone with methyl magnesium bromide to obtain the final pyran. In the case of (A), (B) and (C), the N-benzyl intermediate is prepared, the Grignard reaction run on the N-benzyl pyrone to give the N-benzyl pyran and the benzyl is then removed and replaced with the desired substituent.

The following examples further illustrate this invention:

EXAMPLE 1

Preparation of
2-Benzyl-10-Hydroxy-8-(3-Methyl-2-Octyl)-1,2,3,4-Tetrahydro-5H[1]Benzopyrano[3,4-d]Pyridine Hydrochloride To 2.4 g. of 5-(3-methyl-2-octyl)resorcinol dissolved in 5 cc. of methanesulfonic acid there was added 3.0 g. of ethyl N-benzyl-2-oxo-4-piperidine carboxylate hydrochloride and 3.0 g. of phosphorus oxychloride. The reaction was run at 24°C. with stirring for 5 days. The reaction was then cooled and 30 cc. of water and 30 cc. of chloroform were added thereto. The mixture was stirred until the resulting gum dissolved in the chloroform. The layers were separated, concentrated to dryness and taken up in 30 cc. of ethyl alcohol. Acetonitrile (60 cc.) was added. After standing for several days, the product was recovered by filtration as 2.3 g. of crystals, m.p. 238°–242°C.

EXAMPLE 2

Preparation of
1,3-Ethane-10-Hydroxy-8-(3-Methyl-2-Octyl)-5-Oxo-1,2,3,4-Tetrahydro-5H[1]Benzopyrano[3,4-d]Pyridine Hydrochloride To 47.2 g. of 5-(3-methyl-2-octyl)resorcinol was added 100 cc. of methanesulfonic acid with stirring and cooling. Then, there was added 43.3 g. of ethyl-3-quinuclidinone carboxylate hydrochloride and 60 cc. of phosphorus oxychloride. The reaction was stirred for 5 days at 24°C., cooled and 200 cc. of water and 200 cc. of chloroform added thereto. The mixture was stirred until the gum dissolved in chloroform and the layers were separated. The chloroform layer was washed with water and concentrated to a gummy residue. The gum was triturated with 300 cc. of dimethoxyethane while heating to 90°C. The reaction was cooled and the resulting precipitate filtered. The color was washed out with additional solvent and the product was dried in a vacuum oven to yield 41.4 g. (51%) of the desired intermediate, m.p. 288°–289°C.

EXAMPLE 3

2-Benzyl-10-Hydroxy-8-(Isopropyl)-5-Oxo-(1,2,3,4-Tetrahydro)-5H-[1]-Benzopyrano-[3,4-d]-Pyridine Hydrochloride A mixture of 21.28 g. (0.14 mole) of 5-isopropyl resorcinol, 43.7 g. (0.146 mole) of ethyl-N-benzyl-3-oxo-4-piperidine carboxylate hydrochloride and 80 cc of methane sulfonic acid was treated with 45 cc of phosphorous oxychloride.

The reaction mixture was stirred at room temperature for five days. At the end of this time, 300 cc of chloroform was added. The clear dark solution was poured into 600 cc of water and stirred rapidly for 2½ hours. The suspended solid was filtered and washed several times with dry ether. The yellow solid, 34.5 g. (71%) melted at 285°–288°C. This material recrystallized from methanol had a melting point of 285°–287° (dec.).

Analysis Calcd. for $C_{22}H_{23}NO_3 \cdot HCl$: C, 68.47; H, 6.27; N, 3.63. Found: C, 68.18; H, 6.30; N, 3.58.

EXAMPLE 4

2-Benzyl-10-Hydroxy-8-(n-Pentyl)-5-Oxo-1,2,3,4-Tetrahydro-5H-[1]Benzopyrano[3,4-d]Pyridine Hydrochloride To 3.6 g. olivetol (5-pentyl resorcinol) with cooling, there was added 10 cc methane sulfonic acid. Then add 5.4 g. ethyl N-benzyl-3-oxo-4-piperidine carboxylate hydrochloride. Stir a few minutes and add 6 cc phosphorus oxychloride. After stirring 5 days, dissolve solution in 50 cc chloroform and wash out acid with water. Concentrate chloroform layer to semisolid and triturate with 50 cc dimethoxy ethane, filter solid and wash with additional solvent. Weight 5.4 g., m.p. 278°–280°C. Thin layer chromatography in a mixed solvent benzene-methanol and ammonium hydroxide shows a major spot identical with a known reference compound.

EXAMPLE 5

Preparation of
2-(3,5-Dimethoxyphenyl)-5-(4-Fluorophenyl) Pentane

A solution of 77 g. of 3-(4-fluorophenyl)propylbromide in 300 ml. of ether was added dropwise over a 2 hour period to a refluxing solution of 10 g. of magnesium in 100 ml. of ether. The reaction mixture was refluxed for an additional 30 minutes after the addition was completed. A solution of 68 g. of 3,5-dimethoxyacetophenone in 100 ml. of ether was then added dropwise to the reaction and the reaction mixture was refluxed for 1½ hours. To the reaction was added 300 ml. of a saturated ammonium chloride solution dropwise with stirring. The layers were separated and the aqueous layer extracted with ether. The ether extract was dried over magnesium sulfate and the ether removed in vacuo to give an oil. An additional 111.7 g. of 3(4-fluorophenyl)propylbromide was worked up in the above manner. The products from both runs were hydrogenated in ethanol-HCl using palladium as the catalyst. The solvents and catalyst were removed and the crude material distilled to yield 169.0 g. of 2-(3,5-dimethoxyphenyl)-5-(4-fluorophenyl)pentane, b.p. 145°–155°/0.05 mmHg.

Analysis Calcd. for $C_{19}H_{23}O_2F$: C, 75.60; H, 7.69. Found: C, 75.87; H, 7.98.

EXAMPLE 6

Preparation of
2-(3,5-dihydroxyphenyl)-5-(4-fluorophenyl)pentane

Fifty grams of the above prepared 2-(3,5-dimethoxyphenyl)-5-(4-fluorophenyl)pentane, 450 ml. of acetic acid and 180 ml. of 48% HBr in water were mixed. While cooling, the mixture was saturated with hydrogen bromide gas (approximately ½ hour). The reaction was placed in an 87° bath and stirred for 17 hours. The reaction was then concentrated in vacuo and the residue neutralized with $K_2CO_3$ and $NaHCO_3$, extracted with ether, treated with charcoal and $MgSO_4$ and filtered to yield 45 g. of 2-(3,5-dihydroxyphenyl)-5-(4-fluorophenyl)pentane as a brown oil which distills at 180°/0.01 mmHg.

Analysis Calcd. for $C_{17}H_{25}O_2F$: C, 74.20; H, 6.98. Found: C, 73.56; H, 7.04.

EXAMPLE 7
Preparation of 2-Benzyl-3-(4-fluorophenyl-1-methylbutyl)-10-hydroxy-5-oxo-1,2,3,4-tetrahydro-5H[1]benzopyrano[3,4-d]pyridene hydrochloride To 45 g. of 2-(3,5-dihydroxyphenyl)-5-(4-fluorophenyl) pentane dissolved in 100 ml. of methanesulfonic acid were added in portions, 57 g. of 1-benzyl-3-keto-4-carbethoxy pyridene, hydrochloride. While stirring, 68 g. of $POCl_3$ were added and the solution was stirred for 5 days at room temperature. Water (300 ml.) and 180 ml. of $CHCl_3$ were then added and the reaction mixture stirred for 30 minuts. After the addition of 100 ml. of 15% NaOH, the reaction was stirred for an additional 10 minutes. The $CHCl_3$ layer was separated and extracted with 10% HCl. The $CHCl_3$ layer was concentrated and $CH_3CN$ added thereto to yield 55 g. of the desired product as the hydrochloride salt, m.p. 254°–256°C.

Theory: C, 70.80; H, 6.14; Cl, 6.97; N, 2.75. Found: C, 70.15; H, 6.17; Cl, 7.23; N, 2.74.

EXAMPLE 8
Preparation of 2-Benzyl-5,5-dimethyl-3-(4-fluorophenyl-1-methylbutyl)-10-hydroxy-1,2,3,4-tetrahydro-5H[1]benzopyrano[3,4-d]pyridene Sixty-five grams of the above-prepared 2-Benzyl-3-(4-fluorophenyl-1-methylbutyl)-10-hydroxy-5-oxo-1,2,3,4-tetrahydro-5H[1]benzopyrano[3,4-d]pyridene hydrochloride were suspended in 300 ml. of $CHCl_3$. After adding a $KHCO_3$ solution, the reaction was stirred for 30 minutes. The chloroform layer was separated, dried over $MgSO_4$, concentrated, taken up in benzene and concentrated again. The concentrate was taken up in 185 ml. of hot anisole and the resulting solution was added dropwise to a solution of $CH_3MgBr$ in anisole (prepared by adding 180 g. of $CH_3Br$ in 500 ml. of ether to 40 g. of Mg in 150 ml. of ether, evaporating the ether and adding 300 ml. of anisole). The reaction mixture was stored overnight at 62°C. Water (200 ml.) was added slowly, followed by 400 ml. of 10% $H_2SO_4$. The anisole was removed by steam distillation and the resulting solid was taken up in chloroform, neutralized with $KHCO_3$, dried over $MgSO_4$, concentrated and the product (36.5 g.), m.p. 188°–190°C., crystallized from $CH_3CN$.

EXAMPLE 9
Preparation of 5,5-Dimethyl-3-(4-fluorophenyl-1-methylbutyl)-10-hydroxy-1,2,3,4-tetrahydro-5H[1]benzopyrano[3,4-d]pyridine hydrochloride 32.8 g. of the above-prepared 2-Benzyl-5,5-dimethyl-3-(4-fluorophenyl-1-methylbutyl)-10-hydroxy-1,2,3,4-tetrahydro-5H[1]benzopyrano[3,4-d]pyridine was hydrogenated in ethanol. The catalyst was removed, the solution concentrated, and the desired product was crystallized from ethanol-Skelly B as 19.9 g. of amorphous solid, m.p. 222°–225°C. Theory: C, 69.50; H, 7.23; N, 3.24; Cl, 8.21. Found: C, 69.67; H, 7.34; N, 3.12; Cl, 8.10.

EXAMPLE 10
Preparation of 5,5-Dimethyl-3-(4-fluorophenyl-1-methylbutyl)-10-hydroxy-2-[3-(1-propynyl)]-1,2,3,4-tetrahydro-5H[1]benzopyrano[3,4-d]pyridine 5,5-Dimethyl-3-(4-fluorophenyl-1-methylbutyl)-10-hydroxy-1,2,3,4-tetrahydro-5H[1]benzopyrano[3,4-d]pyridine hydrochloride (19.9 g.) was dissolved in 88 ml. of dimethylformamide. While the solution was cooling, 3.14 g. of propargyl bromide were added. The reaction was stirred at room temperature for 15 hours. Water (120 ml.) was added slowly, whereupon the desired product crystallized. The crystalline product was washed with water and recrystallized from ether and CH CN to yield 5.90 g. of the desired product, m.p. 164°–166°C. Theory: C, 77.25; H, 7.46; N, 3.21. Found: C, 76.80; H, 7.76; N, 3.11.

EXAMPLE 11
1,4-Ethano-5-oxo-8-[1-(1-methylbutyl)-4-fluorophenyl]-1,2,3,4-tetrahydro-5H[1]benzopyrano[3,4-b]pyridine hydrochloride Ethyl 3-quinuclidinone-2-carboxylate hydrochloride (20.0 g.) was added in portions to 22.9 g. of 5-(1-methylbutyl-4-fluorophenyl) resorcinol in 37 ml. of methanesulfonic acid and 24 ml. of phosphorus oxychloride. The mixture was stirred at room temperature for 5 days. To the stirred mixture was added 20 ml. of chloroform and 200 ml. of water. The reaction mixture was stirred for 20 minutes whereupon three layers formed. The water layer was removed and the mixture extracted with more water. The middle layer was then removed and concentrated in vacuo. The addition of CH CN produced a solid which was crystallized from tetrahydrofuran to yield 16.4 g. of the intermediate as a white solid, m.p. 271°–281°C., which produced one spot in thin layer chromatography.

Analysis Calcd. for $C_{25}H_{27}NO_3ClF$: C, 67.55; H, 6.14; N, 3.15; Cl, 8.00. Found: C, 67.63; H, 6.22; N, 3.10; Cl, 7.98.

EXAMPLE 12
5,5-Dimethyl-1,4-ethano-8-[1-(1-methylbutyl)-4-fluorophenyl]-1,2,3,4-tetrahydro-5H[1]benzopyrano[3,4-b]pyridine hydrobromide 1,4-Ethano-5-oxo-8-[1-(1-methylbutyl)-4-fluorophenyl]1,2,3,4-tetrahydro-5H[1]benzopyrano[3,4-b]pyridine hydrochloride (13 g.) was stirred with chloroform, water and potassium bicarbonate for 30 minutes. The chloroform layer was separated and evaporated in vacuo. The concentrate was taken up in benzene, concentrated to dryness, dissolved in 80 ml. of anisole and added to a solution of 100 ml. of 3 molar $CH_3MgBr$ in ether and 100 ml. of anisole. The reaction was stirred under a nitrogen atmosphere at 37°C. for 18 hours. Water (60 ml.) was slowly added to the reaction mixture while cooling, followed by 80 ml. of 20% sulfuric acid. The anisole was removed by steam distillation, and the resulting solid was recrystallized from $CH_3CN$ to yield 10.7 g. of product, m.p. 284°–286°C.

Analysis Calcd. for $C_{27}H_{33}NFO_2Br$: C, 64.19; H, 6.63; N, 2.78. Found: C, 64.00; H, 6.74; N, 2.82.

EXAMPLE 13

1,4-Ethano-8-[1-(1-methylbutyl)phenyl]-5-oxo-1,2,3,4-tetrahydro-5H[1]benzopyrano[3,4-b]pyridine Following a procedure similar to that described in Example 12, 1,4-ethano-8-[1-(1-methylbutyl)phenyl]-5-oxo-1,2,3,4-tetrahydro-5H[1]benzopyrano[3,4-b]pyridine is prepared by reacting 3-quinuclidinone-2-carboxylate with 5-(1-methylbutyl)phenyl resorcinol in the presence of methanesulfonic acid and phosphorus oxychloride.

EXAMPLE 14

5,5-Dimethyl-1,4-ethano-8-[1-(1-methylbutyl)phenyl]1,2,3,4-tetrahydro-5H[1]benzopyrano[3,4-b]pyridine 5,5-Dimethyl-1,4-ethano-8-[1(1-methylbutyl)phenyl]-1,2,3,4-tetrahydro-5H[1]benzopyrano[3,4-b]pyridine is prepared following a procedure similar to that described in Example 13, by reacting 1,4-ethano-8-[1-(1-methylbutyl)phenyl]-5-oxo-1,2,3,4-tetrahydro-5H[1]benzopyrano[3,4-b]pyridine with methyl magnesium bromide in anisole.

EXAMPLE 15

Preparation of 3-(4-fluorophenyl-1-methylbutyl)-1-hydroxy-6,9,9-trimethyl-6a,7,8,10a-tetrahydrodibenzo/b,d/pyran Fourteen grams of the above prepared 2-(3,5-dihydroxyphenyl)-5-(4-fluorophenyl)pentane, 11 g. of ethyl, 4-methyl-2-cyclphexanone-1-carboxylate, 60 ml. of benzene and 3.6 ml. of POCl$_3$ were stirred and refluxed for 4 hours and stirred at room temperature for 12 hours. The reaction was poured into water and sodium bicarbonate, extracted with ether, dried over magnesium sulfate and concentrated to an oil. The oil was extracted with pentane to remove the unreacted keto ester.

The oil was then dissolved in 80 ml. of ether and added to a methyl magnesium bromide solution prepared from 13 g. of magnesium and 60 g. of methyl bromide in 350 ml. of ether. The mixture was refluxed for 20 hours and then added dropwise to 500 ml. of a saturated aqueous ammonium chloride solution. The ether layer was separated, concentrated to dryness and dissolved in 300 ml. of benzene. To the benzene solution was added 0.05 g. of ToSOH and the reaction was refluxed for 2 hours, passing the condensing liquid through 4A molecular sieves. The benzene layer was extracted with sodium bicarbonate in water, concentrated to dryness and dissolved in 500 ml. of pentane. Charcoal was added to the pentane solution and the solution was filtered. The reaction was then chromatographed on a Florosil activated aluminum magnesium silicate 42 mm × 30 inch column and eluted with 95% pet ether and 5% ethyl ether to yield 10.4 g. of product as a colorless gum.

Analysis Calcd. for C$_{26}$H$_{30}$O$_2$F: C, 79.20; H, 8.18. Found: C, 79.36; H, 8.50.

EXAMPLE 16

Preparation of 1-hydroxy-3-(phenyl-1-methylbutyl)-6,9,9-trimethyl-6a,7,8,10a-tetrahydrodibenzo[b,d]pyran 1-Hydroxy-3-(phenyl-1-methylbutyl)-6,9,9-trimethyl-6a,7,8,10a-tetrahydrodibenzo[b,d]pyran was prepared according to the method of Example 15 from 2-(3,5-hydroxy-phenyl)-5-phenylpentane.

EXAMPLE 17

Preparation of 7-(4-fluorophenyl-1-methylbutyl)-9-hydroxy-4-oxo-1,2,3,4-tetrahydrocyclopenta[c][1]benzopyrane Twenty-two grams of 5-(1-methyl-4-p-fluorophenyl) butyl resorcinol, 80 ml. of benzene, 6 ml. of POCl$_3$, 1 drop of water and 13.0 g. of 2-carbethoxycyclopentanone were refluxed for 8 hours and then stirred at room temperature for 8 hours. The solution was concentrated in vacuo and the residue taken up in ether and neutralized with potassium bicarbonate solution. The organic phase was dried over MgSO$_4$ and concentrated. The residue was crystallized from CH$_3$CN to yield 15.6 g. of 7-(4-fluorophenyl-1-methylbutyl)-9-hydroxy-4-oxo-1,2,3,4-tetrahydrocyclopenta[c][1]benzopyran, m.p. 133°–135°C.

Analysis Calcd. for C$_{23}$H$_{23}$O$_3$F: C, 75.50; H, 6.33. Found: C, 75.15; H, 6.21.

EXAMPLE 18

Preparation of 4,4-Dimethyl-7-(4-fluorophenyl-1-methylbutyl)-9-hydroxy-1,2,3,4-tetrahydrocyclopenta[c][1]benzopyran A solution of 15 gm. of the above prepared pyrone in 30 ml. of ether and 50 ml. of benzene were added slowly to a solution of CH$_3$MgBr (0.423 mole) in 250 ml. of ether. The reaction was refluxed for 16 hours, and then 500 ml. of a saturated NH$_4$Cl solution was added slowly. The ether layer was separated, dried over MgSO$_4$ and concentrated. The residue was dissolved in pet ether, decolorized with charcoal and chromatographed on a Florosil activated aluminum magnesium silicate 31 mm × 30 inch column to yield 10.9 g. of product as a pale yellow oil.

Analysis Calcd. for C$_{24}$H$_{29}$O$_2$F: C, 78.80; H, 7.70. Found: C, 78.80; H, 7.84.

We claim:

1. In the process of synthesizing a benzopyran represented by Formula I

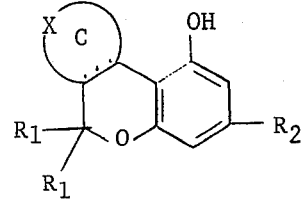

I wherein the C ring is a five-membered ring when X is CH$_2$, or a six-membered ring when X is S or N; R$_1$ is loweralkyl and R$_2$ is C$_1$–C$_{20}$ alkyl, C$_3$–C$_8$ cycloalkyl, loweralkylcycloalkyl or

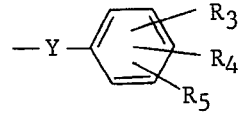

wherein each $R_3$, $R_4$ or $R_5$ are the same or different members of the group consisting of hydrogen, halo, trifluoromethyl or loweralkyl and Y is a straight or branched chain alkylene group having from one to 10 carbon atoms, which process comprises reacting a resorcinol of Formula III

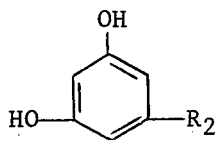

III with a β-keto ester of Formula IV

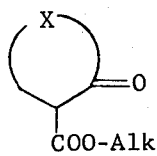

IV to provide the corresponding pyrone intermediate represented by the Formula II

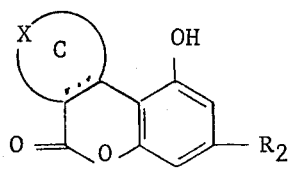

II and reacting said pyrone with a loweralkyl magnesium halide to produce the benzopyran, the improvement comprising the step of reacting said resorcinol with said β-keto ester in the presence of methanesulfonic acid to obtain the pyrone intermediate.

2. The process of claim 1 wherein said resorcinol and said β-keto ester are reacted at a temperature of from 0°C. to 35°C. for a period of 24 to 192 hours.

3. The process of claim 2 wherein said methanesulfonic acid is present in a 5 to 10 mole excess.

* * * * *